(12) United States Patent
Pyatt

(10) Patent No.: US 6,678,909 B1
(45) Date of Patent: Jan. 20, 2004

(54) COMBINATION RASP AND LIFT DEVICE

(75) Inventor: Georgia Pyatt, Fayetteville, AR (US)

(73) Assignee: Marshalltown Company, Marshalltown, IA (US)

( * ) Notice: Subject to any disclaimer, the term of this patent is extended or adjusted under 35 U.S.C. 154(b) by 0 days.

(21) Appl. No.: 10/218,832

(22) Filed: Aug. 14, 2002

(51) Int. Cl.[7] .................. B66F 15/00; B26B 11/00; B23D 71/00
(52) U.S. Cl. .............. 7/158; 7/166; 254/131; 407/29.14
(58) Field of Search ................. 7/151, 158, 166, 7/170; D8/88, 90; 414/11; 407/29.1, 29.14; 254/131, 17, 120

(56) References Cited

U.S. PATENT DOCUMENTS

| | | | |
|---|---|---|---|
| 2,624,489 A | * 1/1953 | Wishart | ............ 7/151 |
| D226,057 S | 1/1973 | Grindinger | |
| D324,474 S | 3/1992 | Killins | |
| D402,514 S | 12/1993 | Killins | |
| 5,823,719 A | 10/1998 | Tyler | |
| D402,468 S | 12/1998 | Killins | |
| 5,996,698 A | * 12/1999 | Behney | ............ 7/164 |
| 5,997,221 A | 12/1999 | Sadler | |
| D440,854 S | 4/2001 | Killins | |
| D442,456 S | 5/2001 | Killins | |
| 6,409,152 B1 | * 6/2002 | Bagley | ............ 7/166 |

* cited by examiner

Primary Examiner—D. S. Meislin
(74) Attorney, Agent, or Firm—Shook, Hardy & Bacon L.L.P.

(57) ABSTRACT

A multifunctional device for removing material from an edge of an object and lifting an object from a support surface is provided. The device includes front and rear portions that are positioned at an angle relative to one another to form a pivot point. The front portion is positioned beneath the object while a user applies a downward force on the rear portion to rotate the device about the pivot point to lift the object from the surface. A pair of opposed sidewalls extend from an upper surface of the device and a top wall is coupled between the sidewalls to form a channel. At least one protrusion extends from the top wall into the channel to remove material from the edge. In addition, a tab may extend into an aperture formed in the rear portion to engage and assist in the removal of a lid from a bottle.

36 Claims, 2 Drawing Sheets

COMBINATION RASP AND LIFT DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a combination rasp and lift device. In particular, the present invention relates to a device that may be used to smooth the edge of a piece of drywall and lift an object from a surface.

When performing various types of construction and home-improvement projects, it is often necessary to lift various objects from the ground for positioning and installation purposes. For instance, a piece of drywall may have to be lifted from the floor when mounting the drywall to a wall frame. Lifting may also be necessary in door installations and adjusting the height of certain appliances. Many of these tasks are made easier when two or more people are involved. Specifically, one person can hold the drywall in place, while the other person fastens or mounts the drywall to the frame. However, these tasks are more difficult when one person has to simultaneously lift the drywall from the ground and fasten it to the frame. Different types of lever devices have been developed to make it easier for one person to lift an object and perform other tasks at the same time with a different tool.

In addition, there is oftentimes a need to cut the drywall during the course of a project. Cutting a piece of drywall normally entails breaking the drywall along a score line, thereby leaving a newly formed edge that is normally jagged and nonuniform. Sandpaper, a rasp or other type of device is normally used to smooth the edge of the drywall.

It is also common for a worker to consume one or more beverages during the course of a project. In order to drink the beverage, the worker typically has to remove a lid from a bottle or container through the use of a bottle opener, screwdriver head or other prying device.

Using separate tools to lift an object from the ground, smooth the edge of a piece of drywall and remove a lid from a bottle or container presents various drawbacks. For example, the user has to constantly switch between tools to accomplish all of the aforementioned tasks. Switching between the tools may be difficult and tiresome when one person is working the project alone. In addition, one or more of these tools may become misplaced or lost during the project, which increases the time and expense of the project.

Various attempts have been made to develop a combination tool that allows a person to lift an object from a surface and smooth an edge of a piece of drywall. One of the devices is shown in U.S. Design Pat. No. 324,474 to Killins. The device in Killins '474 includes a curved surface that is adapted to rest on the support surface and a short lip that extends outwardly from a distal end of the device. The lip of the device is used to support the drywall as it is lifted from the support surface. Further, a notch is formed in a rear portion of the device and may be used to smooth the edge of a piece of drywall.

This prior art tool suffers from a number of deficiencies. For instance, when smoothing the edge of a piece of drywall, the tool has a tendency to slip off the edge of the drywall potentially causing a user to injure his or her hand on the edge of the drywall. In addition, it is difficult for a user to keep his or her foot on the smooth stepping portion of the tool when attempting to lift the object from the support surface. Moreover, it is not uncommon for the drywall to slip off the lip and fall to the ground. Finally, the tool does not provide for a mechanism for removing a lid from a bottle or container.

Accordingly, there remains a need for a combination device that is capable of lifting an object from a surface and removing material from an edge of a piece of drywall while preventing the device from slipping off the edge. In addition, there is also a need for a device that reduces the probability that a user's foot will slip off the device when lifting the object from the surface. Further, there is a need for a device that is also capable of removing a lid from a bottle or container. The present invention fills these needs as well as various other needs.

BRIEF SUMMARY OF THE INVENTION

In order to overcome the above-stated problems and limitations, and to achieve the noted objects, there is provided a multifunctional device that may be used to smooth or remove material from an edge of a piece of drywall. The device may also be used to lift a door, piece of drywall or another object from a support surface into a desired position during installation. Furthermore, the device is adapted to assist in removing a lid from a bottle or container.

In general, the combination device includes upper and lower surfaces, the lower surface being adapted to rest on the support surface. The device further includes front and rear portions that are positioned at an angle relative to one another to form a pivot point. The front portion is adapted to be positioned beneath a portion of the object. A pair of opposed sidewalls extend from the upper surface of the device and have a top wall that extends therebetween. Further, at least one protrusion extends from a bottom surface of said top wall. The edge of a piece of drywall may be positioned and retained between the sidewalls as the protrusion is used to remove material and smooth the edge. In order to lift the object from the surface, the front portion of the device is positioned underneath the object. A user then applies a downward force on the rear portion of the device to rotate the device about the pivot point and lift the object from the surface.

Additionally, the device may include a footrest having a grip surface that provides traction for a user when applying a downward force to lift the object. The device may also include a stop plate that extends from the upper surface of the device and which is adapted to contact a portion of the object. Moreover, the device may include a tab that extends within an aperture formed in the rear portion of the device to engage and assist in removing a lid from a bottle or container.

Further objects, features, and advantages of the present invention over the prior art will become apparent from the detailed description of the drawings which follow, when considered with the attached figures.

BRIEF DESCRIPTION OF THE SEVERAL VIEWS OF THE DRAWINGS

In the accompanying drawings which form a part of the specification and are to be read in conjunction therewith and in which like reference numerals are employed to indicate like parts in the various views.

DETAILED DESCRIPTION OF THE INVENTION

Figure 1:
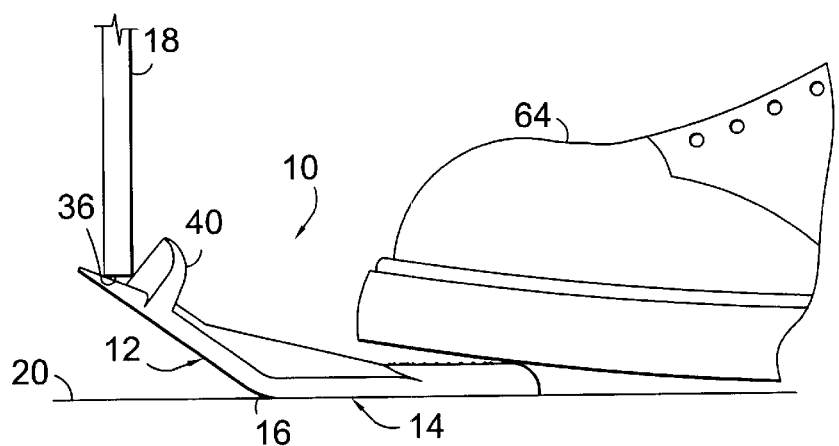
FIG. 1 is an environmental view showing a first embodiment of a device of the present invention being used to lift an object upwardly relative to a support surface.
Figure 4:
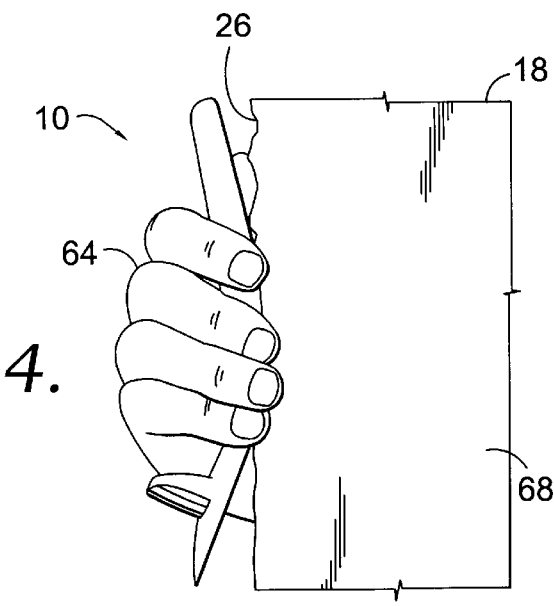
FIG. 4 is an environmental view showing the device being used to remove material from an edge of a piece of drywall.
Figure 5:
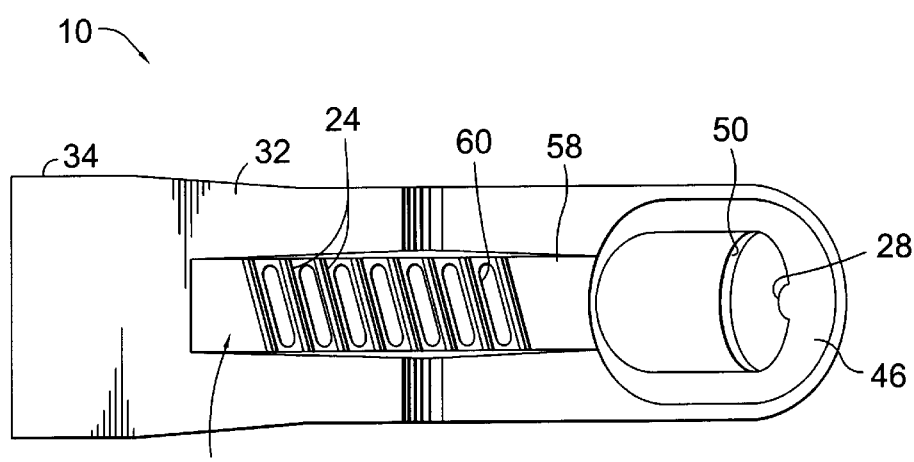
FIG. 5 is a bottom plan view of the device showing a channel formed therein.

Referring now to the drawings in detail, and initially to FIG. 1, numeral 10 generally designates a combination rasp and lift device constructed in accordance with a first embodiment of the present invention. Generally, device 10 includes a front portion 12 and a rear portion 14 that rotate about a pivot point 16 to lift an object 18 from a support surface 20. As best seen in FIG. 5, device 10 further includes a channel 22 having at least one protrusion 24 extending therein that may be used to remove material from an edge 26 of object 18, as illustrated in FIG. 4. Furthermore, with specific reference to FIG. 5, device 10 has a tab 28 formed in rear portion 14 which is adapted to assist in the removal of a lid from a bottle or container.

Figure 2:
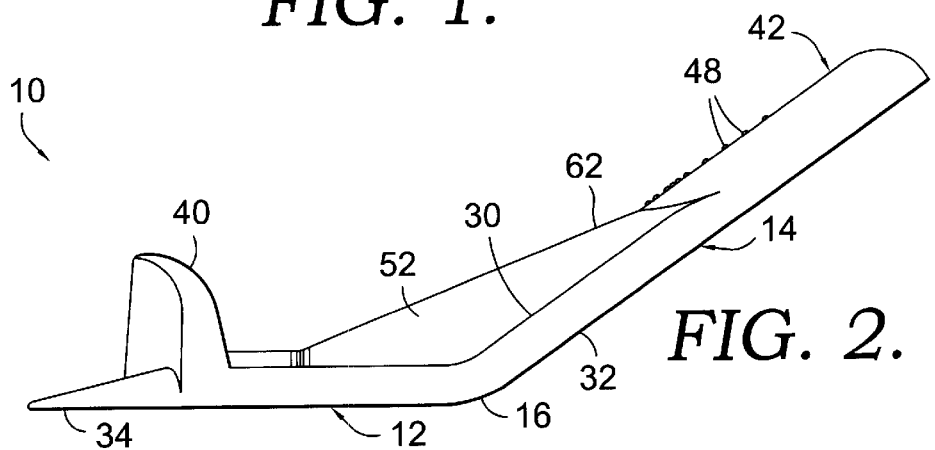
FIG. 2 is a side elevational view of the device.

As best seen in FIG. 2, the front and rear portions 12, 14 that are positioned at an angle relative to one another and meet to form pivot point 16. The angle formed between front and rear portions 12, 14 is approximately 145 degrees. However, it will be understood that the angle formed between front and rear portions may be more or less than 145 degrees. Pivot point 16 is generally located in a middle portion of device 10, thereby making the front and rear portions 12, 14 approximately the same length. Given the position of pivot point 16 and the fact that front portion 12 is generally heavier than rear portion, device 10 has a tendency to rotate about pivot point 16 so that front portion 12 rests on surface 20. The weight distribution of device 10 makes it easy for a user to slide device 10 underneath object 18 prior to lifting it from surface 20.

Pivot point 16 may also be formed toward the front or rear of device 10 to change the relative size of front and rear portions 12, 14. Changing the position of pivot point 16 toward front or rear portions 12, 14 affects the distance object 18 may be lifted from the surface as well as the amount of force required to lift object 18 from surface 20. For example, if pivot point 16 is shifted toward rear portion 14 so that rear portion 14 is shorter than front portion 12, a greater amount of force would be necessary to lift object 18 from surface 20. In this instance, however, device 10 would be able to move object 18 a greater height above surface 20 due to the increased length of front portion 12. On the other hand, if pivot point 16 is shifted toward front portion 12, so that rear portion 14 is longer than front portion 12, less force would be necessary to lift object 18. As such, device 10 would not be able to move object 18 as high from surface 20 as compared to when pivot point 16 is positioned in the middle portion of device 10 or toward rear portion 14.

Figure 3:
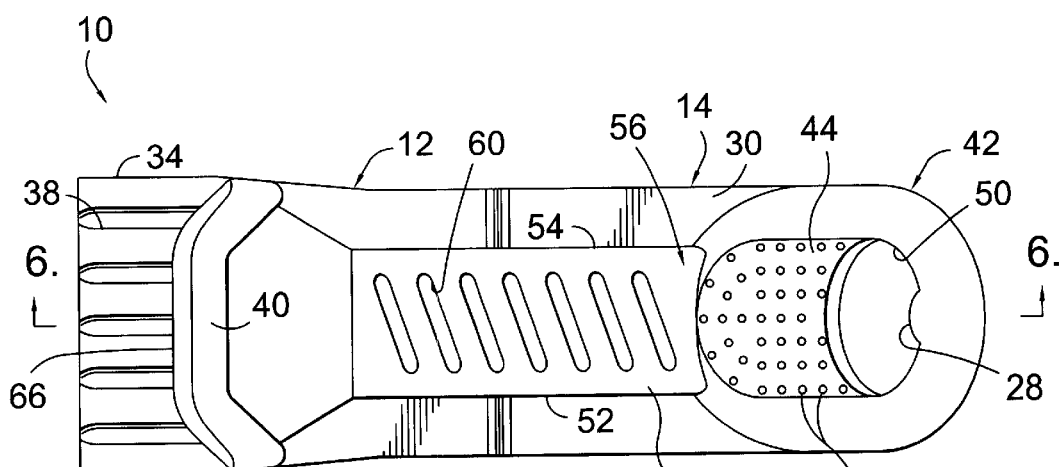
FIG. 3 is a top plan view of the device.

As best seen in FIGS. 2, 3 and 5, device 10 further includes an upper surface 30 and a lower surface 32. Lower surface 32 is adapted to rest on support surface 20 when device 10 is used to lift object 18. It will be understood and appreciated that device 10 may be used to lift various types of objects such as, but not limited to, drywall, doors, appliances and furniture. Further, device 10 is preferably formed of a heat-treated aluminum, but may also be formed of other materials, such as, but not limited to, metals, polymeric materials, wood and the like.

As best seen in FIGS. 1–3, a toe 34 is formed at the distal end of front portion 12 and may be positioned underneath a bottom edge 36 of object 18. Toe 34 preferably has at least one recess 38 formed therein to allow toe 34 to grip bottom edge 36 to make it easier to move object 18 side-to-side during the lifting process. Recess 38 is preferably set about 0.025 inches below the top surface of toe 34. However, it is also within the scope of this invention to provide for a recess set at different depths below the top surface of toe 34. Furthermore, it will be understood that toe 34 may include one or more raised protrusions in addition to, or in place of, recess 38 to assist in gripping bottom edge 36 of object 18.

With specific reference to FIG. 2, toe 34 may also be wedge-shaped to assist in sliding toe 34 underneath bottom edge 36 of object 18. A stop plate 40 extends upwardly from upper surface 30 and is used in conjunction with toe 34 to prevent object 18 from sliding along upper surface 30 toward pivot 16 as device 10 lifts object 18 from surface 20, as best seen in FIG. 1. In addition, stop plate 40 is of a sufficient height and shape to prevent damage to object 18 when toe 34 is slid under bottom edge 36 and object 18 is placed in contact with stop plate 40. Further, the curved shape of stop plate 40 allows object 18 to be moved from side-to-side when supported by toe 34.

Figure 6:
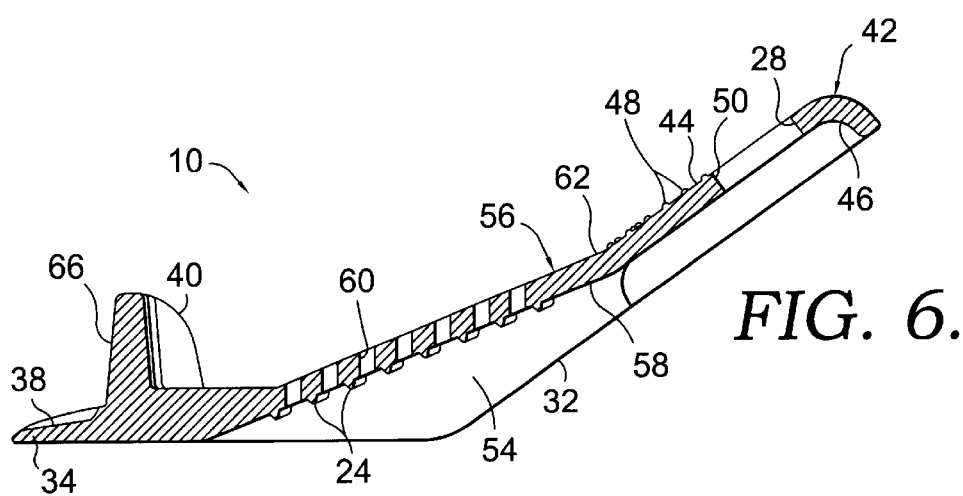
FIG. 6 is a cross-sectional view of the device taken along line 6—6 in FIG. 3.

As best seen in FIGS. 2 and 3, rear portion 14 includes a footrest 42 that extends from upper surface 30 and includes a contact surface 44. Contact surface 44 may be formed of a gripping material such as, but not limited to, rubber or plastic. With reference to FIGS. 5 and 6, a cavity 46 may be formed in lower surface 32 to reduce the weight of device 10. In addition, with additional reference to FIG. 3, one or more nodules 48 may be located on contact surface 44 to provide for increased traction on footrest 42. An aperture 50 is formed in footrest 42 and provides for the display and/or storage of device 10. Furthermore, tab 28 is formed in rear portion 14 and extends within aperture 50 to assist in the removal of a lid from a bottle or container. Tab 28 is generally rounded, but it will be understood that forming tab 28 in other shapes is also within the scope of this invention.

As best seen in FIGS. 2, 3 and 5, channel 22 includes a pair of sidewalls 52, 54 and a top wall 56. Sidewalls 52, 54 extend upwardly from upper surface 30 and top wall 56 extends between sidewalls 52, 54. Sidewalls 52, 54 are positioned approximately 0.75 inches apart to accommodate various thicknesses of drywall. However, the separation between sidewalls 52, 54 may be greater or less than 0.75 inches depending on the thickness of the material to be smoothed. As best seen in FIGS. 5 and 6, preferably a plurality of protrusions 24 extend from a bottom surface 58 of top wall 56 and are positioned diagonally between sidewalls 52, 54. In addition, one or more nodules or other rasping structure may extend from bottom surface 58 of top wall 56 for removing material from edge 26. In general, channel 22 is used to guide device 10 along edge 26 while protrusions 24 remove material from the edge. It should be understood that each of protrusions 24 could be, but is not limited to, a V-shaped ridge or tooth-like structures. In addition, channel 22 extends between front and rear portions 12, 14 to provide for increased rigidity of device 10.

As best seen in FIGS. 3, 5 and 6, a plurality of slots 60 are formed in top wall 56 and extend through a top surface 62 to bottom surface 58. In particular, slots 60 generally extend between sidewalls 52, 54 and are arranged so that they are positioned between protrusions 24. Although slots 60 and protrusions 24 are shown as extending diagonally from sidewall 52 to sidewall 54, it is also within the scope of this invention to arrange slots 60 and/or protrusions 24 so that they extend perpendicular to each sidewall 52, 54. Slots 60 may be positioned between each of the protrusions 24 as shown in FIG. 5, or between any combination of protrusions 24 in top wall 56.

In operation, multifunctional device 10 may be used to (1) lift object 18 from support surface 20, as best seen in FIG. 1, (2) remove material from or smooth an edge 26 of a piece of drywall or other material, as best seen in FIG. 4, and (3) remove or pry a lid from a bottle or container.

If a user 64 wants to lift object 18 from support surface 20, device 10 is placed on surface 20 and rotates about pivot point 16 so that front portion 12 rests on surface 20. Next, user 64 applies the necessary force to slide toe 34 underneath bottom edge 36 of object 18. Toe 34 is slid underneath bottom edge 36 until stop plate 40 is placed in contact with object 18. With reference to FIG. 3, if object 18 is not completely flush with a center portion 66 of stop plate 40, user 64 may continue to adjust device 10 until properly positioned on toe 34 without damaging object 18 due to the curved shape of stop plate 40. The plurality of recesses 38 formed in toe 34 allow device 10 to grip object 18 and move it side-to-side without significant damage to bottom edge 36 of object 18.

With reference to FIG. 2, once toe 34 is positioned underneath bottom edge 36 of object 18, lower surface 34 of front portion 12 rests along support surface 20. Since front and rear portions 12, 14 are angled relative to one another, lower surface 32 of rear portion 14 is positioned at an angle of approximately 35 degrees relative to support surface 20. As best seen in FIG. 1, when user 64 is ready to lift object 18, a downward force is applied on footrest 42 which causes device 10 to rotate in a clockwise direction about pivot point 16. As a result, front portion 12 moves upwardly and object 18 is lifted relative to support surface 20. To lower front portion 12, user 64 reduces the amount of downward force applied to footrest 42. The device 10 will then rotate in a counterclockwise direction about pivot point 16 to lower front portion 12 toward support surface 20.

To smooth or remove material from edge 26, user 64 holds onto device 10 at the sidewalls 52, 54, or on the sides of device 10, as best seen in FIG. 4. Device 10 is then placed over edge 26 so that sidewalls 52, 54 extend over edge 26 and are generally coplanar with a front surface 68 and a back surface (not shown) of object 18. Sidewalls 52, 54 operate as a set of tracks to prevent device 10 from slipping off edge 26. Further, edge 26 is placed within channel 22 so that protrusions 24 are placed in contact with edge 26. Device 10 is then slid back and forth along edge 26 to break apart and remove the rough portions of edge 26. The material that is removed from edge 26 is allowed to escape from channel 22 through slots 60. Allowing the removal of material within channel 22 via slots 60 prevents excess material from building up between each of protrusions 24, thus enhancing the ability of the protrusions 24 to smooth edge 26.

Device 10 may also be used to remove a lid from a bottle or container. This may be accomplished by initially turning device 10 upside down and resting the rounded tab 28 on the top of the bottle. The edge of aperture 50 is then slid underneath the cap, and device 10 is pried upwardly to remove the lid.

It can, therefore, be seen that the invention is one that is designed to overcome the drawbacks and deficiencies existing in the prior art. The invention is a combination device that provides for lifting of an object, rasping an edge and removing a lid from a bottle or container. The angled configuration of the device, combined with the toe and stop plate located in the front portion of the device, allows a user to lift a sheet of drywall, door, appliance, furniture and other objects from a support surface while allowing a user to perform one or more other tasks. The channel prevents the device from slipping off the edge and injuring a user's hand during the rasping process. Furthermore, the slots formed in the channel prevent the build-up of material within the channel, which results in more efficient rasping. Moreover, the multifunctional device has a tab formed therein which allows a user to engage, pry and remove a lid from a bottle or container.

While particular embodiments of the invention have been shown, it will be understood, of course, that the invention is not limited thereto, since modifications may be made by those skilled in the art, particularly in light of the foregoing teachings. Reasonable variation and modification are possible within the scope of the foregoing disclosure of the invention without departing from the spirit of the invention.

What is claimed is:

1. A combination tool for rasping an edge of an object and lifting an object relative to a support surface, said tool comprising:
   a front portion having a toe adapted to be positioned underneath the object;
   a rear portion coupled with said front portion, said rear portion positioned at an angle with respect to said front portion to form a pivot point; and
   a channel extending between said front and rear portions, said channel having at least one protrusion formed therein.

2. The tool of claim 1, wherein said channel includes at least two sidewalls and a top wall.

3. The tool of claim 2, wherein said protrusion extends from one of said sidewalls to the other sidewall.

4. The tool of claim 1, wherein said channel has at least one slot formed therein.

5. The tool of claim 4, wherein said channel has a plurality of protrusions formed therein, and wherein said slot is positioned between said protrusions.

6. The device of claim 1, wherein said rear portion includes a footrest.

7. The device of claim 6, wherein said footrest includes a grip surface.

8. The device of claim 7, further comprising one or more nodules extending from said grip surface.

9. The device of claim 1, wherein said front portion is heavier than said rear portion.

10. The device of claim 1, wherein said toe has at least one recess formed therein.

11. The device of claim 1, further comprising a stop plate extending from said front portion which is adapted to contact a portion of the object.

12. The device of claim 1, wherein the angle between said front and rear portions is approximately 145 degrees.

13. The device of claim 1, wherein said rear portion has an aperture formed therein.

14. The device of claim 13, further comprising a tab formed in said rear portion and extending into said aperture.

15. A device for removing material from an edge of an object and lifting an object from a support surface, said device having an upper surface and a lower surface, said device comprising:

a front portion adapted to be positioned beneath a portion of the object;

a rear portion coupled with said front portion, said rear portion being positioned at an angle relative to said front portion;

a pair of opposed sidewalls extending from the upper surface of the device with a top wall coupled between said sidewalls; and at least one protrusion extending from a bottom surface of said top wall.

16. The device of claim 15, wherein said rear portion includes a footrest.

17. The device of claim 16, wherein said footrest includes a grip surface.

18. The device of claim 17, further comprising one or more nodules extending from said grip surface.

19. The device of claim 15, wherein said top wall has at least one slot formed therein.

20. The device of claim 19, wherein a plurality of protrusions extend from said bottom surface, and wherein said slot is positioned between said protrusions.

21. The device of claim 15, wherein said protrusion extends from one of said sidewalls to the other sidewall.

22. The device of claim 15, wherein said front portion includes a toe adapted to be positioned beneath the object.

23. The device of claim 22, wherein said front portion is heavier than said rear portion.

24. The device of claim 22, wherein said toe has at least one recess formed therein.

25. The device of claim 15, further comprising a stop plate extending from the upper surface of the device which is adapted to contact a portion of the object.

26. The device of claim 15, wherein the angle between said front and rear portions is approximately 145 degrees.

27. The device of claim 15, wherein said rear portion has an aperture formed therein.

28. The device of claim 27, further comprising a tab formed in said rear portion and extending into said aperture.

29. A device for removing material from an edge of an object and lifting an object from a support surface, said device comprising:

front and rear portions, said rear portion positioned at an angle with respect to said front portion;

support means formed in said front portion for supporting the object;

channel means for holding said device on the edge of an object; and rasp means associated with said channel means for removing material from the edge.

30. The device of claim 29, wherein said channel means has slot means formed therein to allow for the removal of material from within said channel means.

31. A multifunctional device for removing material from an edge, lifting an object from a support surface and removing a lid from a container, said device having an upper surface and a lower surface, said lower surface adapted to come into contact with said support surface, said device comprising:

a front portion having a toe adapted to be positioned beneath a portion of the object;

a rear portion coupled with said front portion, said rear portion positioned at an angle relative to said front portion to form a pivot point, said rear portion having an aperture formed therein;

a stop plate extending from the upper surface of said device adapted to contact a portion of the object;

a channel formed in the lower surface, said channel having a pair of opposed sidewalls extending from the upper surface of the device and a top wall extending between said sidewalls;

at least one ridge extending from a bottom surface of said top wall; and a tab formed in said rear portion and extending into said aperture.

32. The device of claim 31, wherein said rear portion includes a footrest having one or more nodules extending therefrom.

33. The device of claim 31, wherein said front portion includes a wedge-shaped toe adapted to be positioned beneath the object.

34. The device of claim 31, wherein the angle between said front and rear portions is approximately 145 degrees.

35. The device of claim 31, wherein said top wall has at least one slot formed therein.

36. The device of claim 35, wherein a plurality of ridges extend from a bottom surface of said top wall, and wherein said slot is positioned between said ridges.

* * * * *